United States Patent
Ten Kate (10) Patent No.: US 10,006,929 B2
(45) Date of Patent: Jun. 26, 2018

(54) METHOD AND APPARATUS FOR RELIABLE DETECTION OF OPENING AND CLOSING EVENTS

(71) Applicant: KONINKLIJKE PHILIPS N.V., Eindhoven (NL)

(72) Inventor: Warner Rudolph Theophile Ten Kate, Waalre (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days. days.

(21) Appl. No.: 15/520,614

(22) PCT Filed: Oct. 14, 2015

(86) PCT No.: PCT/EP2015/073730
§ 371 (c)(1),
(2) Date: Apr. 20, 2017

(87) PCT Pub. No.: WO2016/066422
PCT Pub. Date: May 6, 2016

(65) Prior Publication Data
US 2017/0307651 A1    Oct. 26, 2017

(30) Foreign Application Priority Data

Oct. 28, 2014 (EP) .................................. 14190678

(51) Int. Cl.
*G01P 13/00* (2006.01)
*G01P 7/00* (2006.01)
(Continued)

(52) U.S. Cl.
CPC ................ *G01P 13/00* (2013.01); *G01P 7/00* (2013.01); *G08B 13/08* (2013.01); *A47B 88/00* (2013.01);
(Continued)

(58) Field of Classification Search
None
See application file for complete search history.

(56) References Cited

U.S. PATENT DOCUMENTS

| | | | |
|---|---|---|---|
| 5,538,099 A | 7/1996 | Blackburn et al. | |
| 2013/0327142 A1* | 12/2013 | Hogan | E05B 45/06 73/493 |
| 2014/0236529 A1* | 8/2014 | Gyorfi | G06F 3/017 702/141 |

FOREIGN PATENT DOCUMENTS

| | | |
|---|---|---|
| FR | 2892517 A1 | 4/2007 |
| WO | 2008091244 A2 | 7/2008 |
| WO | 2010096554 A2 | 9/2010 |

OTHER PUBLICATIONS

Papadimitriou et al: "Low-Cost Real-Time 2-D Motion Detection Based on Reconfigurable Computing"; IEEE Transactions on Instrumentation and Measurement, vol. 55, No. 6, Dec. 2006, pp. 2234-2243.

\* cited by examiner

*Primary Examiner* — Leon-Viet Nguyen (57) ABSTRACT

A methods is provided for reliable and accurate detection of opening or closing of doors or drawers using output signals generated by a sensor, the output signals directly or indirectly representative of the acceleration of the sensor over time. Areas under a curve for acceleration, or representations thereof, are determined and occurrence of movement events identified through comparison of calculated areas with certain thresholds. Areas are considered which span between zero crossing points of the acceleration curve, such that all elements of the corresponding sum are of the same sign, and consequent area signals have maximal amplitude. Pairs of substantially equal and opposite area signals may be sought, occurring within a given time separation, these characteristic of an opening or closing motion, consisting of a first
(Continued)

acceleration in a first direction followed by a second in an opposing direction. Apparatus for the reliable detection of opening or closing events is also provided.

15 Claims, 5 Drawing Sheets

(51) Int. Cl.
  *G08B 13/08* (2006.01)
  *E05B 47/00* (2006.01)
  *A47B 88/00* (2017.01)
  *E06B 7/28* (2006.01)
(52) U.S. Cl.
  CPC ......... *E05B 2047/0067* (2013.01); *E06B 7/28* (2013.01)

METHOD AND APPARATUS FOR RELIABLE DETECTION OF OPENING AND CLOSING EVENTS

CROSS-REFERENCE TO PRIOR APPLICATIONS

This application is the U.S. National Phase application under 35 U.S.C. § 371 of International Application No. PCT/EP2015/073730, filed on Oct. 14, 2015, which claims the benefit of European Patent Application No. 14180678.4, filed on Oct. 28, 2014. These applications are hereby incorporated by reference in their entirety herein.

FIELD OF THE INVENTION

The invention relates to a method and apparatus for the reliable detection of opening and closing events associated with doors or drawers. The invention also relates to a computer program product for implementing the method.

BACKGROUND OF THE INVENTION

Smart home environments have been introduced to monitor health and wellbeing of elderly people who are losing their ability to live independently. Such systems typically comprise a plurality of sensors mounted at a variety of places in the home for the monitoring of everyday activities. For example, PIR sensors may be mounted in one or more rooms to detect the presence or movement of persons within those spaces.

One common feature of such systems is the provision of one or more sensor arrangements for the monitoring of opening or closing of doors. For example, such sensor arrangements incorporated to a front door may be used to detect whether and when an elderly person is leaving the house, for example at unusual or dangerous times. In another example, sensors may be mounted to a bathroom or toilet door so that bathing and toileting behavior may be monitored. Attached to kitchen cupboards, cabinets and drawers or even a refrigerator door or bread bin, such sensors may be used to provide information about eating habits.

The monitoring of the opening and closing of doors in this way may be performed by mechanical door switches. These are mounted either to a door frame or to a door itself and are mechanically activated when a door is fully closed, and mechanically released when a door is opened.

One disadvantage of mechanical door switches is that while they are reliable for the detection of a door being fully closed or not fully closed, they cannot be used to monitor other kinds of partial opening or closing events. For example, it would be desirable to be able to detect the movement of a door from partially open to fully open, or from being slightly ajar to being more fully ajar. Likewise, it is desirable to have the capacity to detect closing events even if a door is not pushed fully shut.

Another disadvantage of mechanical switches is that they require installation by a skilled person in order to ensure that the switch neither obstructs the full closure of the door, nor misses contact with the door altogether.

Typically, these problems are overcome by use instead of a sensor which is attached to a door or drawer and which has the capacity to detect or inform about acceleration, for example an accelerometer or a magnetometer. These do not require special skills to install and may be mounted, for example by a care giver, to any part of the door or drawer in interest.

However, a major drawback of state-of-the art acceleration based door sensors is a generally poor reliability in detecting opening and closing events. Output signals from sensors mounted to movable objects may exhibit peak intensities comparable to that of the noise level or signal fluctuations unrelated to the opening or closing event.

US 2013/327142 discloses a way to detect the opening of a door with force, based on a measurement of acceleration and comparison with thresholds. This system is only able to detect violent movement and is not able to detect normal opening and closing events.

A method would be desirable therefore of detecting from the output signal of a movement sensor, the normal opening and closing of a door or drawer to which the sensor is mounted, wherein these movement events are reliably and accurately extricated from background noise carried by the signal.

SUMMARY OF THE INVENTION

It is an object of the invention to provide a way of more reliable sensing. The invention is defined by the independent claims. The dependent claims define advantageous embodiments.

According to the invention, there is provided a method for detecting opening or closing events using a movement sensor. The sensor signal obtained over time is dependent on the movement of the sensor.

The invention is based on the principle of using integrated, or similarly summed, sensor signals for the reliable and accurate detection of the occurrence of movement events. A signal is captured over time from a movement sensor, the signal being either directly or indirectly representative of an acceleration value. Where it is indirectly representative, some further processing might be applied so as to elicit a directly representative acceleration signal. The occurrence of movement events is detected by analysis, not directly of acceleration signal intensities, but of areas under a signal curve between zero-crossing points, or representations thereof. Analysis of areas under curves, as opposed to intensities, enables reliable detection of movement events even when the signal intensity is very low with respect to noise. This is in particular the case, for example, with rotating or sliding opening or closing events of a door or drawer.

An opening or closing event may typically manifest only as a small shift in the rest noise signal of the sensor. Taking the sum or integral of signal values between zero crossings effectively amplifies any shift signal which is present. Typically, both the length of the interval between zero crossings and the magnitude of the signal intensity is increased during movement as compared with at rest. Hence an area under the curve, naturally taking both of these effects into account, can provide greater sensitivity in detecting such movement events than can analysis of signal intensities alone. Furthermore, by summing only between zero-crossing points, the integral is maximal since all samples in the summation have equal sign, and therefore movement events are more readily identifiable from the background noise.

The detecting of opening or closing events based on a comparison of the area signals with one or more thresholds may comprise identifying area signals which exceed the one or more thresholds and which relate to positive acceleration (i.e increasing speed), and determining for each whether there exists a subsequent area signal exceeding the one or more thresholds and relating to negative acceleration (i.e. decreasing speed).

An opening or a closing event is typically characterized by the incidence of a pair of substantially equal and opposite acceleration events: a first acceleration in a first direction as the door or drawer is initially moved from rest, followed a short time later by a second acceleration in an opposing direction as the door or drawer comes to a halt, either in an open position or in a closed position.

Greater accuracy in detecting genuine opening or closing events, as opposed to background noise, accidental knocks, or other natural, non-user induced movement events may be ensured by looking for such characteristic pairs of substantially equal and opposite signals, occurring, for example, within some predetermined threshold time from one another.

Obtaining the signal may comprise first obtaining a sensor output, and subsequently processing said output to extract a single directional component, the direction corresponding to a direction of motion of the sensor.

A typical movement sensor may for example provide output signals representative of movement in two or three spatial dimensions, whereas only motion data corresponding to the one primary direction of motion is of interest in determining open-close events. Shifts in the sensor signal caused by the occurrence of an opening or closing event will manifest only in the components of the signal corresponding to the direction in which the movement event occurred. Greater sensitivity and accuracy in detecting these events may be ensured by extracting this one component from any broader output generated by the sensor.

More particularly, obtaining the signal may comprise:
obtaining a sensor output vector;
defining a second vector representing a direction of motion of the sensor; and
subsequently performing a scalar product operation upon said sensor output vector with respect to the second vector.

Where the second vector is normalized, a scalar product with the output vector generates a single value representing the component of the output vector in the primary direction of motion of the sensor. These component values may then be used to populate the values of the signal subsequently to be utilized within the remainder of the method.

In one embodiment, the second vector representing a direction of motion of the sensor is defined by performing a process of principal component analysis upon one or more components of the obtained sensor output vector.

In this case, the method may be performed no matter what the orientation or arrangement of the movement sensor, since the direction of motion relative to the sensor is calculated automatically as part of the method. Alternatively, the method must be tailored to a particular pre-defined (relative) direction of motion, requiring a movement sensor to be aligned in a particular orientation in order for the method to be effective.

In addition to this, obtaining the sensor output vector itself may comprise first obtaining an initial, three dimensional, output vector and subsequently processing said initial output vector to extract components in the plane perpendicular to the direction of gravity.

Where the primary direction of motion of the sensor, either rotational or linear, is in the horizontal plane (with respect to gravity), then any signal generated by gravitational acceleration may be filtered from a 3D sensor output by projection of this output onto the plane perpendicular to the direction of gravity. The resultant 2D output vector may then be analysed in accordance with the above so as to extract the single component corresponding to the primary direction of motion at any given time.

To this end, an orthogonal pair of basis vectors may be defined which span the plane perpendicular to the direction of gravity. The two dimensional sensor output vector is expressible in terms of a linear combination of these two basis vectors. Each of the two components of the two dimensional sensor output vector may be sought by taking in turn the scalar product of the three dimensional sensor output vector with each of the two defined basis vectors. In this way, sensor output corresponding to motion only in the plane perpendicular to gravity is selected.

The direction of gravity relative to the movement sensor may be determined through analysis of one or more sensor outputs. For example, a low pass filter might be applied to extricate a gravitational signal from background noise, the latter of which will typically manifest as a higher frequency trace within the sensor output.

In the case that the primary direction of motion of the sensor is in a vertical plane (i.e. in a plane parallel with the direction of gravity), the methods of movement detection described above may be of limited efficacy. Where an opening or closing event comprises, for example, a rotation about a horizontal axis, the signal generated by gravitational acceleration may interfere with the sensitivity of the detection method. To enable detection of opening or closing events in a vertical plane, extra steps may optionally be added to the methods described above.

Correspondingly, in another embodiment of the invention, there is provided a method of detecting opening or closing events using a movement sensor comprising:
obtaining a signal over time which is dependent on the movement of the sensor;
detecting by analysis of the signal the occurrence of any rotational opening or closing events about a horizontal axis; and
in the case that no occurrence of an opening or closing event about a horizontal axis is detected, subsequently detecting opening or closing events in accordance with any of the methods described above.

More particularly, the detecting of the occurrence of rotational opening or closing events about a horizontal axis may comprise:
analyzing the signal to determine a direction of gravity over time with respect to the sensor;
detecting changes over time in the determined direction of gravity; and
detecting the occurrence of rotational opening or closing events based on a comparison of the said detected changes with one or more thresholds.

In the case of rotational movement about a horizontal axis, for a sensor which is mounted relative to the moving object in a fixed orientation, the direction of gravity relative to the sensor changes as the object rotates. For a sensor capable of detecting absolute accelerations, the direction of gravity is obtainable by analysis of the sensor output, for example by using a low pass filter to identify the slow-moving orientations characteristic of influence under a gravitational central force.

A significant change in the direction of gravity, occurring for example within a given threshold time interval, may be identified by comparison of determined directions over time. A change exceeding some predetermined threshold may then be used as an identifier of the occurrence of a rotational open or close event.

Additionally, the method above may further comprise identifying changes in the directionality of consecutively detected opening or closing events, by performing one or more vector product operations between the determined direction of gravity vectors for each detected opening or closing event, and identifying changes in directionality by comparing the relative directions of the results of said one or more vector product operations for consecutively detected events.

In this embodiment, the directions of subsequently detected movement events, relative to one another, may be determined such that changes in the movement direction are identifiable. Where a movement event is detected in the manner described above—through identifying two gravity direction vectors, differing by some threshold angle, determined within a given time from one another—a cross product may be taken between the earlier and the later vector, the result depending upon the relative orientation of the two vectors within the co-ordinate system used by the method. Where one movement event in one direction is followed by a second movement event in a second opposing direction, the results of cross-product operations between earlier and later vectors will have opposing relative directionalities for the two events. This opposing directionality may then be detected by, for example, calculating the scalar product between the two results, a negative result of which may then be used to identify a change in the direction of movement.

Alternatively, opposing directionality might be detected by other means. For example, basis vectors representing the primary direction of cross product results might first be determined (through an automatic learning process), and subsequent cross product results subjected to a coordinate transformation to project them onto these axes. A change in the directionality of movement events is then detected by looking for a change in sign of the cross-product results corresponding to consecutive movement events.

Obtaining a signal over time may comprise using an accelerometer.

The output signal of an accelerometer is directly representative of acceleration values and would not therefore require additional processing in order to carry out the methods described above.

According to the invention, there is also provided an apparatus for the detection of opening or closing events.

Further to this, the sensor may be mounted to the moveable object with a known axis in the primary direction of movement. The processing element of the system may then be adapted to assume a primary direction of movement of the movement sensor aligned with this known axis of the movement sensor.

In this case, the primary direction of motion need not be calculated by the processing unit as part of obtaining the signal over time; by mounting the sensor in alignment with the direction of motion, the processing unit may be adapted to obtain the signal components in the direction of motion by, for example, performing scalar product operations with a fixed pre-determined (relative) direction vector.

The sensor may be an accelerometer.

The opening or closing events may be characterized by a first acceleration in a first direction, followed by a second acceleration in a second, opposing, direction.

According to the invention there is provided a computer program product for implementing the method of the invention. Preferably at least the last three steps of the method of the invention are implemented in the program product. A microprocessor can be a regular semiconductor based type microprocessor such as central processing unit of a computer or portable device. Storable medium can be any type of medium for digitally storing data and program code. The communications network can be any suitable network such as LAN, WAN WiFi or other wireless network.

BRIEF DESCRIPTION OF THE DRAWINGS

Examples of the invention will now be described in detail with reference to the accompanying drawings, in which.

DETAILED DESCRIPTION OF THE EMBODIMENTS

The invention provides methods for reliable and accurate detection of opening or closing of doors or drawers using output signals generated by a sensor, the output signals directly or indirectly representative of the acceleration of the sensor over time. Areas under a curve for acceleration, or representations thereof, are determined and occurrence of movement events identified through comparison of calculated areas with certain thresholds. Areas are considered which span between zero crossing points of the acceleration curve, such that all elements of the corresponding sum are of the same sign, and consequent area signals have maximal amplitude. Pairs of substantially equal and opposite area signals may be sought, occurring within a given time separation, these characteristic of an opening or closing motion, consisting of a first acceleration in a first direction followed by a second in an opposing direction. Apparatus for the reliable detection of opening or closing events is also provided.

In the below examples are described methods for analyzing one or more sensor outputs in which are made reference to features such data points, trend lines, curves and other explicitly graphical concepts. Where such terminologies are employed, they are to be understood always as potentially figurative and not limiting to overtly graphical methodologies. The terms curve, trace or trend-line for example, may be understood to mean graphical elements or, alternatively, mathematically equivalent representations thereof. The expressions, where they are employed, are intended as heuristic or pictorial shortcuts to explaining methods or procedures which may be carried out in any number of ways, but in terms which map onto methods for achieving these ends frequently employed by skilled persons.

Figure 1:
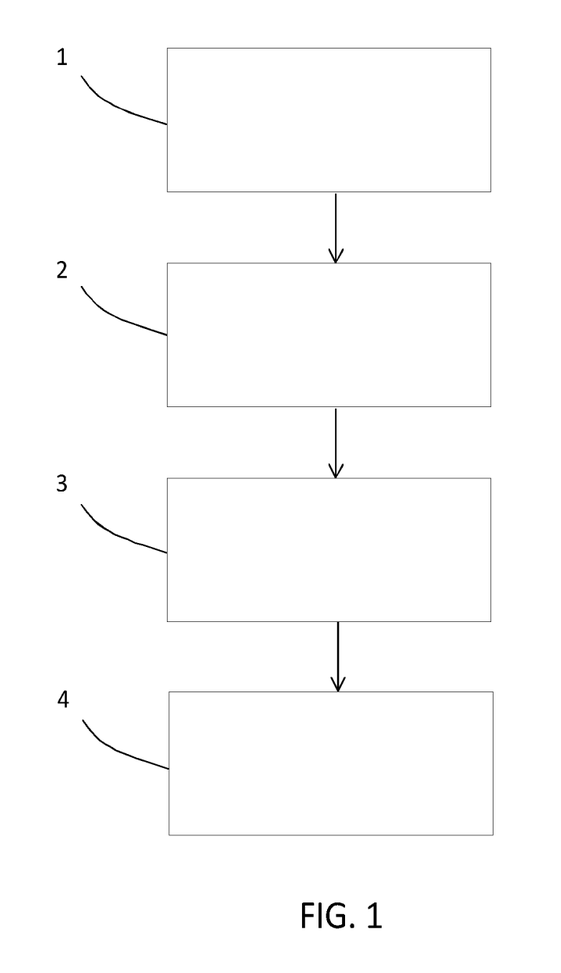
FIG. 1 shows a schematic diagram of a first example method for detecting opening and closing events in accordance with the invention.

In FIG. 1 is shown a schematic diagram representing a first example of a method in accordance with the invention. A signal is first obtained from a movement sensor over time in step 1, the signal directly or indirectly representative of acceleration. The signal is then analyzed in step 2 in order to identity two or more zero-crossing points of the signal at points in time at which it is indicated by the signal that the acceleration of the sensor crosses the zero-level. Once two or more of such points have been identified, one or more area-signal values are determined in step 3, wherein these values represent areas under a curve of acceleration between zero-crossing points. Finally, determined area-signal values are compared with one or more threshold values in step 4 in order to identify intervals of time corresponding with the occurrence of an opening or closing event.

In a simplest example of the invention, a signal is captured which is continuous and which is directly representative of the acceleration of the sensor over time. A captured signal is subsequently analyzed in order to identify points in time which are indicated as corresponding to moments at which the acceleration of the sensor crosses zero. In the case of a time-continuous signal, this corresponds simply to determining points along the continuous signal trace at which the signal value is zero, and hence where the signal trace crosses from positive to negative values, and vice versa.

In the case that a non-continuous signal is captured, for example from a sensor which outputs discrete data values at regular time intervals, zero-crossing points may not coincide with any data point output by the sensor; there be no data point with a signal value of zero. In this case, identification of zero-crossing points may be achieved less directly, through determining points in time at which it is indicated by the discrete data values that the corresponding continuous output signal which has been sampled crosses the zero level. For example, adjacent data points having signal values of differing sign might be sought, and zero-crossing points defined as those points falling temporally equidistant from each point in such a pair. Or, in another example, processing might be performed to fit a trend line to discrete data values output by the sensor, and said trend line subsequently analysed for zero-crossings in the same way as for a continuous signal.

This process requires a zero-level for the signal to be well defined. In a simplest case, the sensor is sufficiently well calibrated that a zero level is already well defined, and corresponds to numerical zero, such that captured data points have positive or negative polarity depending on the directionality of detected acceleration. In alternative examples, however, the zero-level may be well defined but may not correspond with a numerical value of zero, i.e. all output data values have a positive polarity and the zero-level corresponds to some DC offset value. In this case, further processing might be applied so as to first determine a DC offset value and subsequently to subtract the determined value from each signal value. Determination of zero-crossing points may then be performed through identifying points at which the signal indicates that acceleration crosses the value of absolute zero.

In an alternative example, however, a DC offset value might be determined and subsequently zero-crossing points identified simply by finding points in time at which the signal indicates acceleration crossing the determined DC value.

Estimation of a DC value might be achieved, for example, through use of a low-pass filter (LPF), and in particular a Moving Average (MA) filter. Such a filter is of low complexity. One potential drawback however is that transients may appear so that the acceleration signal of an open or close movement—an alternate pair of acceleration and deceleration signals—will be "extended" with additional excursions next to the true ones due to the movement. In general, however, this effect can be tolerated. One way to suppress the transient excursions, for example, is to use a non-linear filter, such as a median filter.

Once two or more zero-crossing points are identified, the signal is further processed to determine values representing areas under the curve of acceleration between identified zero-crossing points. In the case of a continuous signal output, an area under a curve may be determined simply through a process of integration, performed between limits defined, in the simplest case, by zero crossing points. As explained above, by taking zero-crossing points as the boundaries of integration, maximal sensitivity of detection is realized, since all samples in that summation have identical sign. Arbitrary fluctuations in the signal (noise and alike) will have frequent alteration around the zero level and hence their cumulative sum (between any pair of zero points) remains small.

Upon moving the door/drawer there will be an acceleration to start the movement and a deceleration to end the movement. In both moments, the acceleration will have some excursion away from zero. Additionally, this excursion will appear in a pair of opposite sign, where the order is dependent on the direction of movement. This permits the potentiality of distinguishing between an opening event and a closing event.

Figure 2:
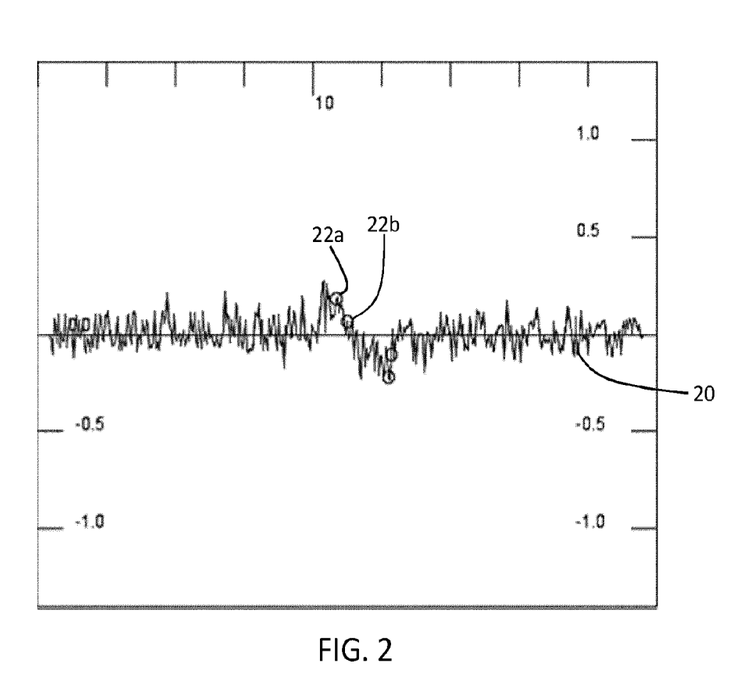
FIG. 2 shows an example of a signal trace representing an extracted single directional component of movement.

In FIG. 2 is shown an example of a signal trace 20 obtained from a sensor representing acceleration of the sensor in a primary direction of motion, over time. An opening/closing event is just identifiable at the center of the trace, marked out by the characteristic pair of oppositely signed peaks. A set of sample values are shown as 22, with the first two labeled consecutively 22*a*, 22*b*.

Figure 3:
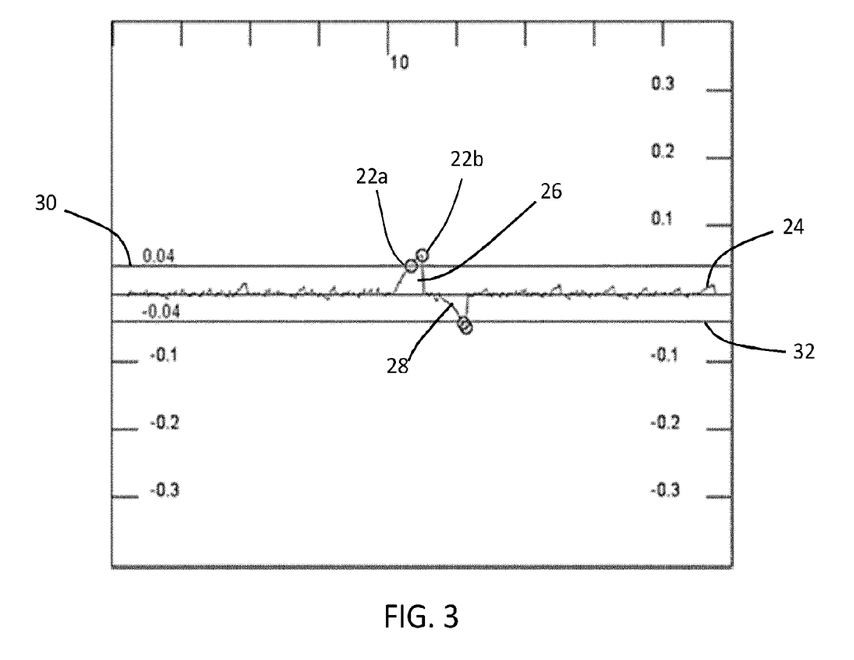
FIG. 3 shows an example of a signal trace representing the results of integrating a sensor output between zero crossing points.

FIG. 3 shows a signal trace 24 representing the signal 20 of FIG. 2 once integration has been performed between zero-crossing points. Trace 24 is therefore a continuous representation of the area-signals calculated in step 3 of the method explained with reference to FIG. 1. The sampled values 22 of signal 20 are overlaid in the same order, at corresponding time points on the signal 24. It can be seen that sample value 22*b* shown in FIG. 2, which coincides with the final minor peak of signal 20 before a zero point is crossed, corresponds to the tip of the first 26 of the two major peaks 26,28 in signal 24.

Compared with the signal of FIG. 2, the peaks in signal 24, representing the (first) acceleration and (second) deceleration of an opening or closing event are clearly visible and clearly distinguishable from the background noise.

Integration might be performed across all or just part of the temporal range spanned by each pair of zero crossing points, although the former is preferred. In the case of the latter, limits of integration are not necessarily defined by crossing points, but in accordance with some other chosen scheme. Limits however, still fall within a range bounded by a relevant pair of zero-crossing points.

In the case of non-continuous output, values representing areas under curves might be determined differently. In the case that a continuous trend-line is fitted to discrete data output points, areas under curves may be calculated in the same manner as for continuous sensor output, i.e. through integration of the trend curve between zero crossing points, either fully or partially. In the case that adjacent discrete data points are linked simply by straight lines, such that an emergent trend-line in non-smooth, calculations of 'areas under curves' may reduce simply to a sum of 'areas of parallelograms'.

Alternatively again, the areas are regarded as purely figurative, and the 'areas under curves' are manifested simply by sums of multiples of signal values, where the multipliers are the time intervals between signal points. Where a sensor reliably outputs values at given time intervals, all multipliers are the same, in which case they may effectively be replaced by a multiplier in front of the entire sum, equal to the number of data points populating the sum.

Note that in all above examples, if a DC value is calculated but not subtracted, area signals may need to be corrected by subtraction from each of a product of the DC bias value with the spanned time interval corresponding to the given calculated area.

Once one or more values have been generated representing areas under acceleration curves between zero crossing points, these 'area-signals' are tested to pass one or more thresholds. Where the absolute value of an area signal exceeds one or more thresholds, this may be used to identify the particular interval in time as corresponding with the occurrence of a movement event.

A typical value for a threshold might be for example 0.04 (in units of m/s). In FIG. 3 is marked this example threshold 30 for positive acceleration 18 and threshold 32 for negative acceleration, overlaid upon the area-under-curve signal 24. This value assumes that in the area-under-curve integration, the outcome has been multiplied with the sample time, so that the summation is normalized to the sample frequency. The threshold may be made user-configurable, or adaptive. In the latter case, the employed value may, for example, be adapted according to outcomes from (earlier) open/close movements performed by the user.

Where the captured sensor signal provides a direct representation of the acceleration of the sensor signal over time, the detecting of opening or closing events may be achieved by application of the above method directly to the sensor output. However, in the case that a signal is captured which is only indirectly representative of the acceleration of the sensor over time, further processing might be applied to the raw sensor output before the main method is applied.

For example, a signal might be captured which is representative of the velocity of the sensor, relative to the ground. In this case, a signal representing acceleration might be obtained simply by differentiating the sensor output signal with respect to time. In another example, the signal might be representative of a displacement of the sensor, with respect to some fixed external reference point. In this case, an acceleration signal may again be obtained by a differentiation operation, this time applied twice, with respect to time. Note that in both cases the differentiation operation eliminates any DC bias, and hence this step in the method is automatically fulfilled.

Since, for a typical opening or closing event, the door or drawer in question will be motionless before and after the open or close movement, the corresponding acceleration signal will comprise both an acceleration part and a deceleration part. Hence, the integration signal corresponding to such a movement event will feature a pair of peaks of opposite polarity, as shown in FIG. 3 as peaks 26 and 28. Greater accuracy in detecting genuine opening or closing events, as opposed to background noise, accidental knocks, or other natural, non-user induced movement events may be ensured by looking not just for individual area signals exceeding the one or more threshold values, but for such characteristic pairs of substantially equal and opposite signals, occurring, for example, within some predetermined threshold time from one another.

Hence, in one embodiment of the invention, in the case that a threshold pass is found for a given area signal, said signal is then tested for an accompanying threshold pass of opposite sign. Optionally, both area signals may then further be tested to determine whether they fall within some defined restricted time span. In this example, only in the case that both passes are found in close co-occurrence is it determined that an open/close event has occurred. If the second pass has the same sign as the first pass, then the second pass may assume the role of (potential) first pass. If the co-occurrence time has been passed, all threshold passes are discarded.

Additionally, it may further be determined the order in which polarities occur, and this information utilized to inform about the direction of movement, either 'open' or 'close'. Without calibration, it is not possible to determine in an absolute sense which movement events correspond to opening and which to closing. In an alternative approach, a heuristic may be used to distinguish absolutely between opening and closing. For example, it might be assumed that a door or drawer is mostly closed, and events of an opposite direction happening nearby each other in time constitute an open (first) followed by a closed (second) event.

It may also happen that events have equal direction sign. When these occur close together in time, they indicate a further opening, for example, and might correspondingly be grouped together as a single (opening) event. Other groupings might additionally or alternatively be applied, depending on the intended application of the invention. For example, consecutive open and close events (differentiated from one another through methods as described above) might be grouped as a single event of a particular kind, such as 'drawer usage event', or 'cupboard accessing event'.

In general, a typical movement sensor may provide output signals representative of movement in two or three spatial dimensions. However, only motion data corresponding to the one primary direction of motion is of interest in determining open-close events. Shifts in the sensor signal caused by the occurrence of an opening or closing event will manifest only in the components of the signal corresponding to the direction in which the movement event occurs. Greater sensitivity and accuracy in detecting these events may be ensured by extracting this one component from any broader output generated by the sensor.

Figure 4:
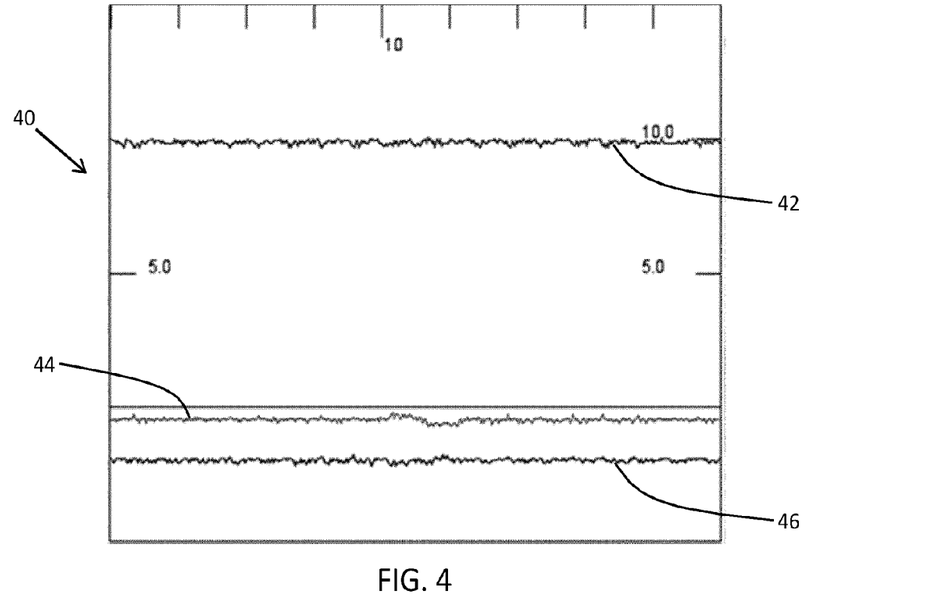
FIG. 4 shows an example of signal traces output by a 3D movement sensor.

Hence in one embodiment of the invention, a signal 20 is obtained through first obtaining a multi-dimensional sensor output 40 as shown in FIG. 4, and subsequently processing said output to extract a single directional component, the direction corresponding to a direction of motion of the sensor.

The output signals 40 generated by a 3D movement sensor are shown in FIG. 4, wherein separate signals 42, 44, 46 are captured corresponding to motion in X, Y and Z directions (relative to a sensor coordinate system) respectively. The signals 40 are subsequently processed so as to extract a single signal such as signal 20 shown in FIG. 2, and representative of movement in the primary direction of motion of the sensor. An open/close event is just visible around the center of Y-direction trace 44. In FIG. 2, this event is more clearly visible in the extracted, one-dimensional signal 20.

In one example, the extraction of a single directional component 20 is achieved through performing a scalar product operation between a multi-dimensional output 40 of the movement sensor, this output representable as a vector, and a second vector defined to represent a primary direction of motion of the sensor. In some cases, the second direction vector may be known in advance. For example, where the sensor is attached against a door or drawer panel such that its z-axis points in the primary open/close direction, the process of extracting single directional component 20 may be simplified to merely a hard-coded selection of the sensor's signal in the z-axis (where in this case a mono-axial sensor has not instead, for example, been used).

In general however, the primary axis of motion can vary. For example, in the case of a sliding drawer, the sensor could also be mounted against the side wall of the drawer, possibly turned to some degree, so that the main (horizontal) axis is a combination of the sensor axes along said side wall. The sensor might also be lying on the drawer's bottom, possibly tilted and with no single sensor axis parallel with the sliding direction.

In this general case, according to one embodiment, an algorithm may be performed in order to determine the main direction of motion. This algorithm may be run continuously, or alternatively might be called only during a particular calibration phase, after which the main direction remains fixed. In this case, computational load and hence battery consumption may be spared. Optionally, in addition, the calibration may be checked after some period of use.

Below is described one example of an algorithm which may be employed for the determination of a primary direction of motion, for the purposes of extracting a single corresponding component of a multi-component sensor output. Other algorithmic methods exist and could be applied in place of the example described below.

According to one example, the first step in finding the main direction is to find two vectors that span the (horizontal) plane in which said main direction lies. The normal to the plane is given by the direction of gravity which may be estimated by analysis of one or more sensor outputs. For example a low pass filter might be applied to extricate the gravitational signal from background noise, the latter of which will typically manifest as a much higher frequency trace within the sensor output. Preferably a non-linear filter like a median filter is used, so that transient effects are minimized. Optionally, an additional filter may be applied to further smooth the direction signal. For example, only part of the signal where there is little or no activity (e.g. a low variance) is selected.

Given the direction of gravity, in the sensor co-ordinate system, two spanning (i.e. basis) vectors may be found as follows (although other methods are conceivable). Required are two linearly independent vectors, both orthogonal to the direction of gravity. Denoting the direction of gravity by $g=(g_x, g_y, g_z)$, a first vector may be found, for example, via the construction:

$$a_{x0}=(g_y-g_z, g_z-g_x, g_x-g_y)$$

It may be verified directly that $a_{x0}$ is orthogonal to g by computing their dot product. A second basis vector may then be found by computing the vector (cross) product of g and $a_{x0}$:

$$a_{x1}=g \times a_{x0}$$

The cross product ensures that $a_{x1}$ is orthogonal to both $a_{x0}$ and g, and additionally the chosen order of g and $a_{x0}$ in the cross product ensures that the result of the cross product $a_{x0} \times a_{x1}$ points in the direction of g. The so found $a_{x0}$, $a_{x1}$ lie in the horizontal plane.

Following this, the (3D) acceleration signal is projected onto the axes defined by the above found pair of basis vectors, in this way obtaining two 1D signals, accP0 and accP1, these representing components of acceleration in the horizontal plane. The projection may for example be executed by first normalizing the $a_{x0}$ and $a_{x1}$ vectors to unit size $$\hat{a}_{x0}=a_{x0}/|a_{x0}| \quad \hat{a}_{x1}=a_{x1}/|a_{x1}|$$

and by subsequently computing sample-wise the scalar product of the 3D acceleration signal, acc, with each normalized $a_x$ vector, i.e.

$$accP0=acc \cdot \hat{a}_{x0} \quad accP1=acc \cdot \hat{a}_{x1}$$

accP0 and accP1 and lie in the horizontal plane, i.e. perpendicular to the direction of gravity. The primary component of acceleration, i.e. the component corresponding to the primary direction of motion, will be some linear combination of these two 1D signals.

The direction of movement in the horizontal plane may be found through a process of Principal Component Analysis (PCA) applied to the two 1D acceleration signals. PCA is well known in the art. One example of an application of the process is now described.

The 1D signals, accP0 and accP1, are observed over a segment with a window size of typically 0.4 seconds. For this window, their mean values ($\mu_0$, $\mu_1$) are computed and subtracted from all sample values obtained for the signals throughout the window period. The so-obtained values are subsequently used to compute corresponding variance ($cov_{00}$, $cov_{11}$) and covariance ($cov_{01}$) values:

$$cov_{00}=1/N\Sigma(accP0-\mu_0)^2$$

$$cov_{11}=1/N\Sigma(accP1-\mu_1)^2$$

$$cov_{01}=1/N\Sigma(accP0-\mu_0)(accP1-\mu_1)$$

where N is the number of samples obtained throughout the duration of the window. (Alternatively, N might be omitted in this case, since it does not affect the outcomes apart from scaling intermediate results).

Again, as is known in the art, the principal components may be found through an eigenvalue analysis of the covariance matrix:

$$\underline{M} = \begin{pmatrix} cov_{00} & cov_{01} \\ cov_{01} & cov_{11} \end{pmatrix}$$

Since the covariance matrix is 2×2, the eigenvalues can be easily expressed in closed form:

$$\lambda_0=(cov_{00}+cov_{11})/2+\sqrt{((cov_{00}-cov_{11})^2/4+cov_{01}^2)}$$

$$\lambda_1=(cov_{00}+cov_{11})/2-\sqrt{((cov_{00}-cov_{11})^2/4+cov_{01}^2)}$$

In addition, since it is the main direction only which is of interest, the corresponding main eigenvalue may be identified as $\lambda_0$, since always $\lambda_0 > \lambda_1$. The eigenvector $q_0$ corresponding with $\lambda_0$ (i.e. such that $\underline{M}q_0=\lambda_0 q_0$) can also be expressed in closed form. For example:

$$q_0=q_x\hat{a}_{x0}+q_y\hat{a}_{x1}=(q_x,q_y)=\text{normalize}((cov_{01},\lambda_0-cov_{00}))$$

Vector $q_0$ provides the main direction of movement in the horizontal plane, and, hence, the 1D component of acceleration in that direction follows as:

$$accPC=q_0 \cdot accP=q_x*accP0+q_y*accP1$$

A small uncertainty remains in that the sign of $q_0$ is arbitrary and may switch to an opposing direction at a next set of calculated covariances. Such a switch would also trigger a sign change in accPC, which would be artificial and unconnected with anything physical. In one example, this effect might be stabilized through computing only one eigenvector for the entire segment, or, alternatively, if an eigenvector per sample is computed, to memorize the eigenvector computed at the previous cycle and to test whether the scalar product between the current vector and the previous one has a negative result. Assuming a small change in direction, the scalar product should always be positive, a negative outcome indicating a sign change in the computational result. In the case that the scalar product is negative, both $q_x$ and $q_y$ are reversed in sign.

In the case that the primary direction of motion of the sensor is not in a horizontal plane (i.e. in a plane perpendicular to the direction of gravity), the methods of movement detection described above may be of limited efficacy. In particular, where an opening or closing event comprises a rotation about a horizontal, or near horizontal, axis (with respect to gravity), the continuously changing signal generated by gravitational acceleration throughout this turn, floods the small acceleration signal generated by the rotation itself, making opening and closing events difficult to detect. To enable detection of such rotational opening or closing events about a horizontal axis, extra steps may therefore optionally be added the methods described above.

Indeed, note that in practice, rotation about any hinge which is not perfectly vertical (i.e. perfectly aligned with the direction of gravity) will generate acceleration signals with some lesser or greater degree of the above described gravitational 'interference'. There may in practice therefore be defined some range of horizontal or near-horizontal hinge angles, rotation about which necessitates application of additional steps to detect, while for angles less deviant from the vertical, the methods so far described may remain sufficiently effective. Merely for ease of explanation however, in the description which follows, reference may be made steps pertaining to rotational events about 'horizontal' axes per se. This however, is not intended as limiting, but rather as an abbreviation, and should be read and understood within the context of the considerations here discussed.

Correspondingly, in another embodiment of the invention, rotational opening or closing events about a horizontal axis are additionally tested for, through monitoring changes in the detected direction of gravity (relative to the sensor). In one example, this is achieved through computing the scalar product between the current gravitational direction $g_1$ and that, $g_0$, a few seconds before, e.g. 1 second. The gravity signal (generated for example by applying a Low Pass Filter to a sensor output signal) is preferably normalized to unit size, such that the scalar product is less influenced by accidental accelerations of other nature than turning. The computed scalar product is compared with one or more thresholds in order to determine whether a turning event has occurred. In one example, the threshold for open/close event might be expressed in terms of the cosine of the minimum angle over which the turn must happen, i.e. (in the case of normalized g vectors):

$g_0 \cdot g_1 \leq |g_0||g_1|\cos \theta = \cos \theta$

A typical threshold for the scalar product might be 0.9, which corresponds to an angular separation of approximately 25°.

In one example, in the case that a change is detected, an additional optional step is performed to determine the direction of the turning event (open or close). Given freedom of mounting and way of turning (upper hinge or lower hinge) it is not possible to determine in isolation whether a rotation corresponds to opening or closing, but distinguishing between the two is possible. Alternatively, as in the case for horizontal motion above, a heuristic might be used to distinguish absolutely between opening and closing. For example, it might be assumed that a door is mostly closed and events of an opposite direction happening nearby each other in time constitute an open (first) followed by a closed (second) event.

One possible method for distinguishing opening from closing events is by observing the vector (cross) product of the two gravity direction vectors $g_0$, $g_1$ (wherein the two are measured one second apart and have a scalar product smaller than the designated threshold value). The result of the vector product, $cs_1$ is stored and is compared with that computed at the previous instance at which the threshold value was also met, $cs_0$. At initiation $cs_0$ is set to null (0,0,0). The comparison comprises calculating the scalar product between the two, $cs_0 \cdot cs_1$. In the case that the scalar product is positive the turn is in the same direction as the previous turning event. For example, if open was concluded at the last instance, the current event is also an (or possibly even the same) open event. In the case that the scalar product is negative, it indicates that the current turn in a different direction to the last. Optionally, the current event may be additionally tested to determine whether a certain amount of time has elapsed since the previous event, e.g. 1 second.

In addition, if the scalar product $cs_0 \cdot cs_1$ is negative, the stored variable $cs_0$ is updated so as to be equal to $cs_1$. In this way the next threshold pass of gravity direction vectors $g_0$, $g_1$ from the same open/close event will not result in a next negative scalar product. Further improvement may be achieved by also updating $cs_0$ in this way in the case that the scalar product $cs_0 \cdot cs_1$ is positive. In particular, if the norm of $cs_1$ is greater than that of $cs_0$, then $cs_0$ is updated to $cs_1$. Since $g_0$ and $g_1$ have unit size, the magnitude of their cross product is equal to the sine of the angle separating them. Hence, a larger norm reflects a larger angle between $g_0$ and $g_1$, i.e. a larger turn.

Figure 5:
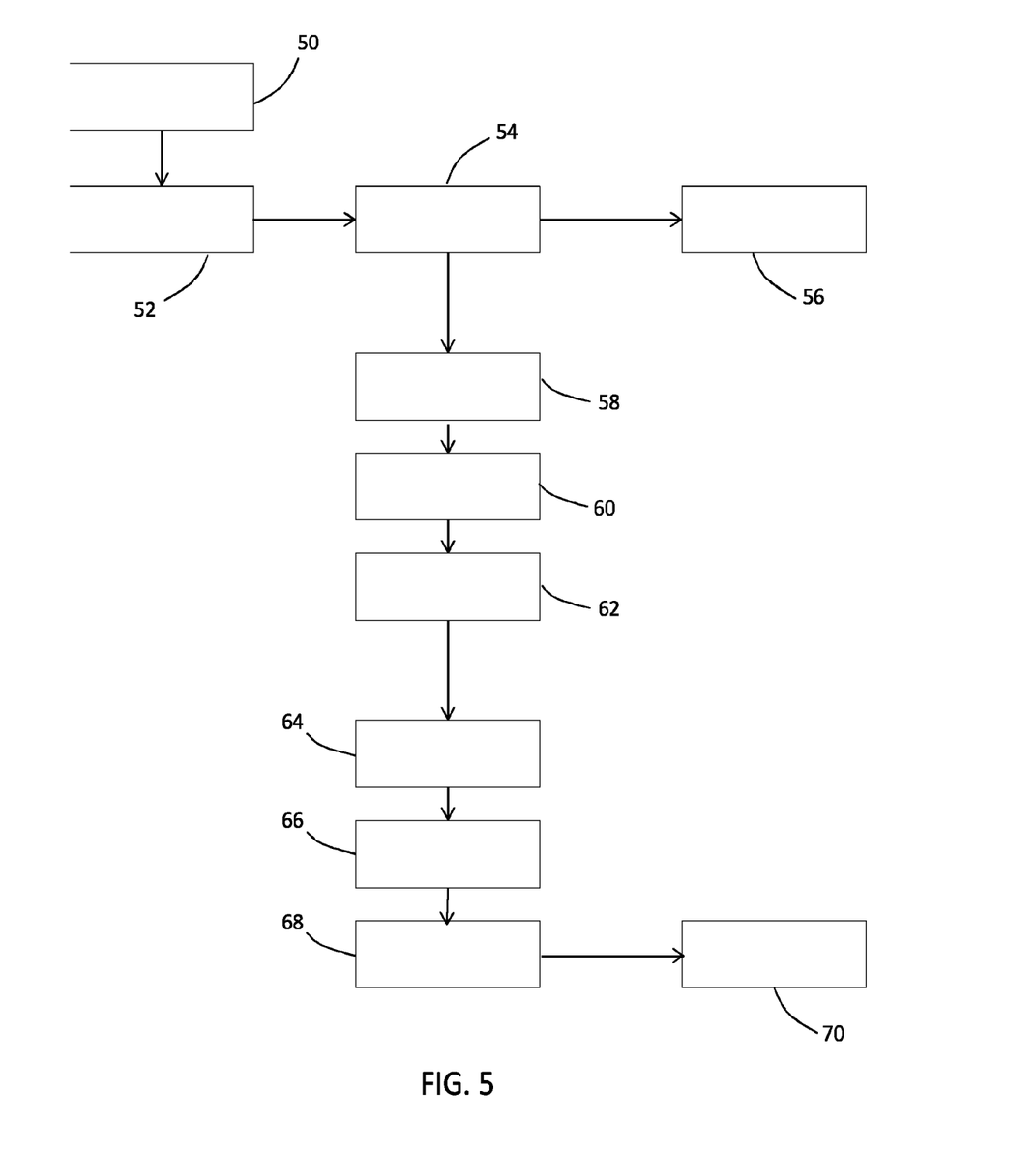
FIG. 5 shows a schematic diagram of an example method for detecting opening and closing events in accordance with the invention.

In FIG. 5 is presented a schematic diagram of an embodiment of a method incorporating a number of the example features described above. According to this embodiment, the multi-dimensional signal of the sensor is calibrated in step 50 in advance of operation. The main process flow of the method begins with an estimation of the direction of gravity in step 52 followed by testing for opening or closing events about a horizontal hinge in step 54, both in accordance with methods described in the examples above, or otherwise.

In the case that an open/close event about a horizontal axis is detected, some further events may be executed accordingly in step 56, and the rest of the process flow suspended. The method may then, for example, be restarted, perhaps skipping calibration 50 to begin again at estimating a direction of gravity in step 52.

In the case that no opening or closing event is detected about a horizontal axis, process flow transfers to the detection of open/close events about a vertical axis, or linearly as in the case of the motion of a drawer. In the example of FIG. 5, a single-directional signal component is obtained in step 58 by first determining a pair of basis vectors spanning the horizontal plane and subsequently utilizing these to determine a vector representing a primary direction of motion of the sensor in step 60 (both in accordance with methods described above, or otherwise). A single signal component representing motion in this direction is then extracted in step 62.

Following this are executed the final three method steps of the embodiment of FIG. 5: first the signal obtained via the steps 58,60,62 is analysed in order to identity two or more zero-crossing points of the signal in step 64; points in time at which it is indicated by the signal that the acceleration of the sensor crosses the zero-level. Once two or more of such points have been identified, one or more area-signal values are determined in step 66, wherein these values represent areas under a curve of acceleration between zero-crossing points. Finally, determined area-signal values are compared with one or more threshold values in step 68 in order to identify intervals of time corresponding with the occurrence of an opening or closing event. In the case that an open/close event is detected, again some further events may be executed in step 70 and possibly subsequently the process flow is restarted. In the case that no open-close event is detected, the method may be looped in a continuous fashion until and if such an event is detected.

The advantage of this embodiment is that all varieties of open and close event are detectable (both horizontal linear and rotational events and vertical rotational events) as part of the same process flow. Furthermore, the sensor may be mounted in any orientation and any position to the door or drawer in question, since steps are included to determine a primary direction of motion in real time. Additionally, processing resource is conserved by estimating a direction of gravity only once, at the beginning of the process flow, the result of this one calculation subsequently applicable both in steps 54 and 58.

Figure 6:
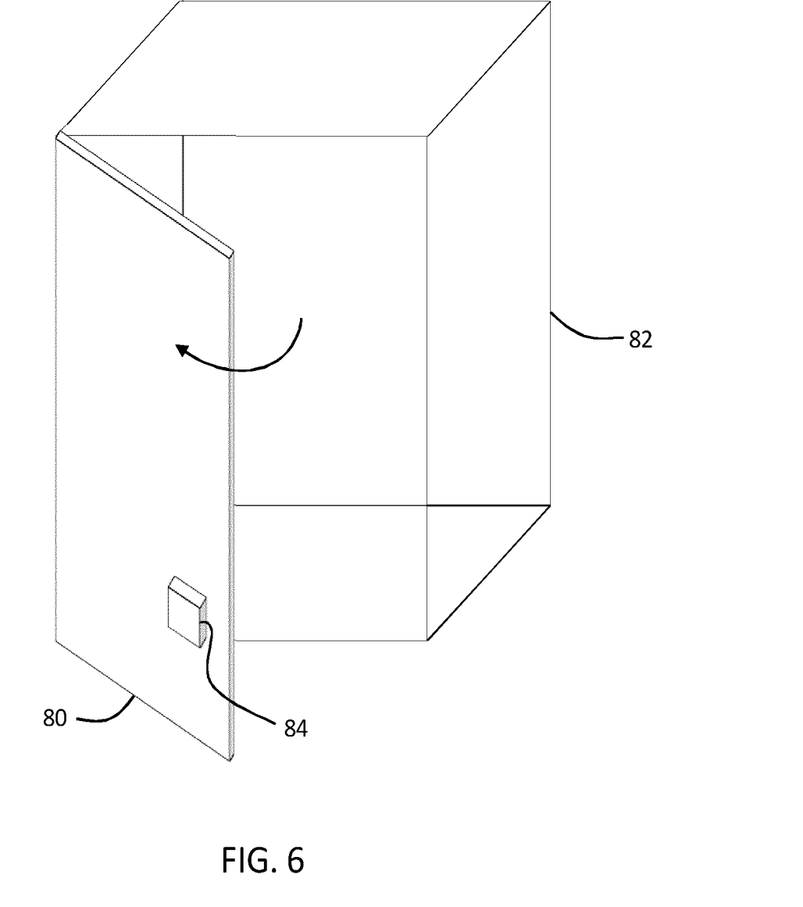
FIG. 6 shows an example of an apparatus for detecting opening and closing events in accordance with the invention.

In FIG. 6 is depicted one example of an apparatus for detecting opening or closing events in accordance with the invention. To the door 80 of a cupboard 82 is affixed a movement sensor 84. The door is rotatable about a vertical hinge, by which it attached to the cupboard at one edge. The sensor outputs a signal over time dependent upon its motion. As the door is opened or closed, the sensor initially accelerates from rest, in an azimuthal direction (relative to a global cylindrical co-ordinate system, having basis z-direction vector coincident with axis of rotation), and subsequently, some small time later, decelerates back to rest again in the opposite azimuthal direction. Equivalently, relative to the (Cartesian) co-ordinate system of the sensor itself, there is initially an acceleration in a positive linear direction (the tangential direction of motion of the door), and subsequently some small time later, a deceleration in the directly opposite linear direction.

In the particular case of the embodiment of FIG. 6, the motion during an opening or closing event is rotational, occurring about the vertical hinge. Hence throughout the duration of the movement of the sensor, in addition to the rotational acceleration, there will be some varying (centripetal) acceleration acting upon the sensor in the radial direction (i.e. in the direction toward the hinge). This acceleration increases from zero at the start of the motion (i.e. when at rest), to some (possibly constant) non-zero value whilst the door is rotating, before declining back to zero at the end of the turn. However, in a preferred embodiment, the centripetal acceleration not occurring in the primary direction of motion (i.e. the azimuthal direction) is filtered from the sensor signal, and only angular acceleration extracted and considered.

In one embodiment, the sensor 84 is mounted with a known axis in the primary direction of motion, such that a processing element may be hard wired to extract components in this known direction and need not use processing resource calculating the direction of motion in real time.

Various possibilities exist regarding the sensor apparatus used to acquire a signal. In one example, the signal is obtained using an accelerometer. An accelerometer carries the advantage that its output represents a measure of proper acceleration, wherein by proper acceleration is meant absolute acceleration, including that induced by gravity. Hence a method utilizing signals from this variety of sensor does not require any additional processing to generate a signal directly representative of the acceleration of the sensor over time. Furthermore, the embodiments utilizing changing direction of gravity to detect rotational events about a horizontal axis are directly implementable from the sensor output.

In alternative embodiments, however, other sorts of sensor might be utilized. In one example, output signals from a magnetometer are employed to detect opening and closing events. A magnetometer may in general be used to provide measures of the strength and direction of a magnetic field at a point in space. Over short distances, the strength and direction of the Earth's (geo)magnetic field remain approximately constant, and hence this field vector may be utilised in a similar fashion to the gravitational field vector in method steps 52, 54 (in which are tested for rotational events about a horizontal or near horizontal axis). The method of 52, 54 is applicable for rotation axes which lie in or close to the plane perpendicular to constant (vertical) gravitational vector. Similarly, a method utilising constant geomagnetic field vector is applicable for rotation events having axis in or substantially in the plane perpendicular to this vector. The direction of the Earth's magnetic field is different at different points on the Earth's surface. In Europe, for example, the direction is Northward, plus a component pointing inward toward the Earth's surface at an angle of approximately 50-70 degrees. Once the field vector is identified, changes in its direction (relative to sensor co-ordinate system) may be detected and used to indicate rotation events about axes lying in the above described perpendicular plane.

Additionally, the output of a magnetometer might be employed within primary method steps 64, 66,68, subject to the application of additional steps for the extraction of an acceleration signal from the raw sensor output. These steps might include, for example, a (perhaps continuous) analysis of sensor output in order to determine a 'displacement' vector corresponding to the position of the sensor, relative to some arbitrarily defined point in the sensor co-ordinate system. Such a vector could be established by for example subtracting measured field direction vector at a given point in time, from an established reference value for the field direction, set perhaps during a calibration stage. A thus generated time-varying displacement signal might then be differentiated twice with respect to time, thereby generating an acceleration signal, to which steps 64, 66, 68 might then be applied as previously described.

Alternatively again, in cases where the door turns about a hinge, a gyroscope might be used. A gyroscope is sensitive to angular speed. Hence, in this case, output signals from the sensor would need to be differentiated once with respect to time in order to generate a signal representative of (angular) acceleration. One benefit of utilizing a gyroscope sensor, as opposed to for example an accelerometer, is that the amplitude of signal output is independent of the mounting location of the sensor. This follows from the fact that the gyroscope is sensitive to angular velocity (or angular speed), which is independent of radial distance from the axis, whereas accelerometer output varies inversely with radial distance of the sensor from the axis. Hence, a gyroscope may be mounted at any location on a door and generate a signal of the same strength.

The data processing described above can be carried out in the device itself, or the raw sensor data can be output for remote data processing. For example, multiple sensors may supply data to a central remote processor, for example using any suitable wireless data transfer protocol. Thus, the processing unit and the sensors do not need to be housed in the same place. For example, the door-mounted unit 84 in FIG. 6 may comprise only a movement sensor and a transmitter for transmitting the sensor data wirelessly to a separate processing unit. Together, the door-mounted unit and the remote processing unit define an apparatus for the detection of opening or closing events. Instead, the full processing capability may be provided in the single unit.

The history of open or close events can be used by a caregiver to analyze the behavior of a patient. The sensor information or the open and close event information can be sent automatically to the caregiver over the internet or a mobile phone network, or it may be extracted from the sensor system on site.

The processing to convert sensor signals to open and close event detection, whether performed locally as part of the sensor unit or remotely, can be implemented by a processing element, for example a controller. The controller can be implemented in numerous ways, with software and/or hardware, to perform the various functions required. A processor is one example of a controller which employs one or more microprocessors that may be programmed using software (e.g., microcode) to perform the required functions. A controller may however be implemented with or without employing a processor, and also may be implemented as a combination of dedicated hardware to perform some functions and a processor (e.g., one or more programmed microprocessors and associated circuitry) to perform other functions.

Examples of controller components that may be employed in various embodiments of the present disclosure include, but are not limited to, conventional microprocessors, application specific integrated circuits (ASICs), and field-programmable gate arrays (FPGAs).

In various implementations, a processor or controller may be associated with one or more storage media such as volatile and non-volatile computer memory such as RAM, PROM, EPROM, and EEPROM. The storage media may be encoded with one or more programs that, when executed on one or more processors and/or controllers, perform at the required functions. Various storage media may be fixed within a processor or controller or may be transportable, such that the one or more programs stored thereon can be loaded into a processor or controller.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage. Any reference signs in the claims should not be construed as limiting the scope.

The invention claimed is:

1. A method for detecting opening or closing events using a movement sensor that is capable of providing a sensor signal which is dependent on the movement of the movement sensor, the method comprising the steps of:
   a) obtaining the sensor signal over time;
   b) determining crossing time points at which the sensor signal indicates acceleration of the movement sensor crossing zero;
   c) deriving area signals representing an area under a curve of the acceleration of the movement sensor versus time, with a respective area signal derived between successive crossing time points; and
   d) detecting opening or closing events based on a comparison of the area signals with one or more thresholds.

2. The method as claimed in claim 1, wherein the detecting of opening or closing events comprises identifying area signals which exceed the one or more thresholds and which relate to positive acceleration, and determining for each whether there exists a subsequent area signal exceeding the one or more thresholds and relating to negative acceleration.

3. The method as claimed in claim 1, wherein obtaining the sensor signal comprises first obtaining a sensor output, and subsequently processing said output to extract a single directional component, the direction corresponding to a direction of motion of the sensor.

4. The method as claimed in claim 3, wherein obtaining the sensor signal comprises:
   obtaining a sensor output vector;
   defining a second vector representing a direction of motion of the sensor; and
   subsequently performing a scalar product operation upon said sensor output vector with respect to the second vector.

5. The method as claimed in claim 4, wherein defining the second vector representing a direction of motion of the sensor comprises performing a process of principal component analysis upon one or more components of the obtained sensor output vector.

6. The method as claimed in claim 5, wherein obtaining the sensor output vector comprises first obtaining an initial, three dimensional, output vector and subsequently processing said initial output vector to extract components in the plane perpendicular to the direction of gravity.

7. The method as claimed in claim 6, further comprising determining the direction of gravity relative to the movement sensor through analysis of one or more sensor outputs.

8. A method of detecting opening or closing events using a movement sensor that is capable of providing a sensor signal which is dependent on the movement of the movement sensor, the method comprising:
   obtaining the sensor signal over time;
   detecting by analysis of the sensor signal the occurrence of any rotational opening or closing events about a horizontal axis; and
   in the case that no occurrence of an opening or closing event about a horizontal axis is detected, subsequently detecting opening or closing events in accordance with the method of claim 1.

9. The method as claimed in claim 8, wherein detecting the occurrence of rotational opening or closing events about a horizontal axis comprises:
   analyzing the sensor signal to determine a direction of gravity over time with respect to the movement sensor;
   detecting changes over time in the determined direction of gravity; and
   detecting the occurrence of rotational opening or closing events based on a comparison of the said detected changes with one or more thresholds.

10. The method as claimed in claim 9, further comprising identifying changes in the directionality of consecutively detected opening or closing events, by performing one or more vector product operations between the determined direction of gravity vectors for each detected opening or closing event, and identifying changes in directionality by comparing the sign of the results of said one or more vector product operations for consecutively detected events.

11. A non-transitory computer program product stored on a computer-readable medium and containing program code instructions which when executed by a microprocessor causes the microprocessor to implement the method as claimed in claim 1.

12. The method as claimed in claim 1, wherein obtaining a signal over time comprises using an accelerometer.

13. An apparatus for the detection of opening or closing events, comprising:
- a movement sensor adapted to be mounted to a moveable object;
- a processing element for analyzing one or more sensor outputs and detecting from said analysis the occurrence of opening or closing events, wherein said processing element is adapted to:
- obtain a signal over time which is dependent on the movement of the sensor;
- determine crossing time points at which the sensor signal indicates acceleration of the movement sensor crossing zero;
- derive area signals representing the area under a curve of the acceleration of the movement sensor versus time, with a respective area signal derived between successive crossing time points; and
- detect opening or closing events based on a comparison of the area signals with one or more thresholds.

14. The apparatus for the detection of opening or closing events as claimed in claim 13, wherein the processing element is adapted to assume a primary direction of movement of the movement sensor aligned with a known axis of the movement sensor.

15. The apparatus for the detection of opening or closing events as claimed in claim 13, wherein the sensor is an accelerometer, and wherein the opening or closing events are for example characterized by a first acceleration in a first direction, followed by a second acceleration in a second, opposing, direction.

* * * * *